United States Patent
Pinger et al.

(10) Patent No.: US 8,403,410 B1
(45) Date of Patent: Mar. 26, 2013

(54) VEHICLE SEAT ASSEMBLY WITH OCCUPANT PACK SUPPORT

(75) Inventors: April Marie Pinger, Gilbert, AZ (US);
Terry James Wilhelm, Gilbert, AZ (US); Joshua Kevin Platt, Phoenix, AZ (US); D. Brent Noel, Queen Creek, AZ (US); Joshua Steven Campbell, Gilbert, AZ (US)

(73) Assignee: Armorworks Enterprises, LLC, Chandler, AZ (US)

( * ) Notice: Subject to any disclaimer, the term of this patent is extended or adjusted under 35 U.S.C. 154(b) by 306 days.

(21) Appl. No.: 12/806,373

(22) Filed: Aug. 11, 2010

Related U.S. Application Data

(60) Provisional application No. 61/325,769, filed on Apr. 19, 2010, provisional application No. 61/284,043, filed on Dec. 11, 2009, provisional application No. 61/273,944, filed on Aug. 11, 2009.

(51) Int. Cl.
*A47C 7/02* (2006.01)
*A47C 7/62* (2006.01)
(52) U.S. Cl. .............................. 297/188.05; 297/230.14

(58) Field of Classification Search ............. 297/188.05, 297/230.1, 230.14, 284.3
See application file for complete search history.

(56) References Cited

U.S. PATENT DOCUMENTS

| | | | | |
|---|---|---|---|---|
| 2,060,298 | A * | 11/1936 | Gailey | 297/230.13 |
| 3,853,351 | A * | 12/1974 | Lassiter | 297/452.48 |
| 6,502,902 | B1 * | 1/2003 | Romero | 297/352 |
| 6,527,339 | B2 * | 3/2003 | Voris | 297/219.12 |
| 6,793,291 | B1 | 9/2004 | Kocher | |
| 7,000,985 | B2 * | 2/2006 | Belgarde | 297/255 |
| 7,125,079 | B1 * | 10/2006 | Lee et al. | 297/353 |
| 2007/0273192 | A1 * | 11/2007 | Van Druff et al. | 297/339 |
| 2008/0169691 | A1 * | 7/2008 | Nation | 297/230.14 |
| 2008/0231097 | A1 * | 9/2008 | Rumack | 297/219.12 |

* cited by examiner

*Primary Examiner* — David Dunn
*Assistant Examiner* — Philip Gabler
(74) *Attorney, Agent, or Firm* — Schwartz Law Firm, P.C.

(57) ABSTRACT

A vehicle seat assembly includes a seat bottom, seat back, and occupant pack support. The seat bottom is adapted for use in a substantially horizontal position. The seat back resides adjacent the seat bottom, and comprises a back support surface adapted for use in a substantially upright position. The occupant pack support resides adjacent the back support surface of the seat back, and defines a generally flat inwardly-projecting shelf for vertically supporting an equipment pack carried on a back of an occupant seated in the assembly.

14 Claims, 12 Drawing Sheets

VEHICLE SEAT ASSEMBLY WITH OCCUPANT PACK SUPPORT

TECHNICAL FIELD AND BACKGROUND

The present disclosure relates broadly and generally to a vehicle seat assembly, and in one exemplary embodiment, to an ultra-heavy-duty military vehicle seat incorporating an occupant pack support. The present seat assembly may include features designed to promote correct ergonomics and comfort to occupants required to sit for long periods of time. In various military applications, the seat assembly may minimize the fatigue of traveling to combat zones, and may reduce chronic and pervasive back injuries caused by rough terrain in certain geographic regions.

Studies show that correct body posture can reduce fatigue and improve overall health. Proper ergonomic seating not only minimizes the impact of a range of kinetic threats, but also protects against the effects of accidents, collisions, rollovers, vertical impact events, and post-blast dynamics. The present seat assembly may offer both equipment and lumbar support for occupants in a 5-95% profile range. In exemplary implementations, the seat assembly includes structural features designed to support back-carried equipment packs to take weight off the shoulders, and allow the occupant to sit substantially upright.

SUMMARY OF EXEMPLARY EMBODIMENTS

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a vehicle seat assembly including a seat bottom, seat back, and occupant pack support. The seat bottom is adapted for use in a substantially horizontal position. The seat back resides adjacent the seat bottom, and comprises a substantially planar surface adapted for use in a substantially upright position. The occupant pack support resides adjacent the planar surface of the seat back, and defines a generally flat inwardly-projecting shelf for vertically supporting an equipment pack carried on a back of an occupant seated in the assembly.

The term "equipment pack" is defined broadly herein to mean any pack, bag, case, pocketed garment, harness, or the like designed to contain, hold, or carry equipment such as (for example) supplies, medical kits, ammunition, weapons, body armor, armor plates, parachutes, oxygen tanks, water canisters, and floatation devices. The preceding list is provided by way of example only, and is not intended to limited the broad scope and definition of this element.

The term "seat bottom" refers to any stand alone seat structure or continuous length platform (e.g., bench) or frame designed to support a seated occupant.

The term "seat back" refers to any seat structure adapted to extend in a generally upright or reclined position, and designed to provide back support to the occupant. The seat back may be integrally joined to the seat bottom, or separate and detached from the seat bottom.

The term "substantially planar surface" refers to a generally flat surface which may or may not resiliently deform against the weight of a seat occupant.

According to another exemplary embodiment, the vehicle seat assembly comprises means for adjusting a position of the occupant pack support relative to the seat bottom and seat back.

According to another exemplary embodiment, the seat back includes a generally U-shaped tubular back frame comprising opposing spaced-apart side bars and an distal end bar.

According to another exemplary embodiment, the seat back further comprises a rigid (e.g. metal) back pan extending between the side bars of the tubular back frame.

According to another exemplary embodiment, a pack-support adjustment mechanism is operatively secured to the seat back pan, and enables select vertical displacement of the occupant pack support relative to the seat bottom.

According to another exemplary embodiment, the pack-support adjustment mechanism comprises a linear slide having opposing first and second ends, a slide stop located at the first end, and a pack-support mounting block located at the second end and fixed to the occupant pack support. The linear slide defines a range of vertical displacement of the occupant pack support between the slide stop and the pack-support mounting block.

According to another exemplary embodiment, the range of vertical displacement of the occupant pack support is between 2.0 to 5.0 inches.

According to another exemplary embodiment, an open-ended seat mounting block is fixed to the seat back pan. The seat mounting block slidably receives the linear slide therethrough to adjustably position the occupant pack support relative to the seat bottom and the seat back.

According to another exemplary embodiment, the vertical adjustment mechanism further comprises an elongated toothed pivot bar adjacent the linear slide, and adapted for selectively engaging at least one locking pin fixed to the seat mounting block.

According to another exemplary embodiment, the vertical adjustment mechanism further comprises an occupant-actuated push button operatively linked to the toothed pivot bar, and adapted for being depressed to pivot the toothed pivot bar away from the locking pin and into an unlocked position. In this position, the linear slide is freely slidable relative to the seat mounting block to adjust the vertical location of the occupant pack support relative to the seat bottom.

According to another exemplary embodiment, at least one spring cooperates with the occupant-actuated push button to normal urge the toothed pivot bar into a locked position relative to the locking pin of the seat mounting block.

According to another exemplary embodiment, first and second assembly mounting brackets pivotably interconnect respective proximal ends of the seat bottom and seat back.

According to another exemplary embodiment, the seat bottom incorporates a generally U-shaped tubular seat frame comprising opposing spaced-apart side bars and a distal end bar.

According to another exemplary embodiment, an occupant foot rest is located beneath the distal end bar of the seat frame.

According to another exemplary embodiment, the seat assembly incorporates a flexible multi-point occupant restraint harness (not shown).

According to another exemplary embodiment, the inwardly-projecting shelf defined by the occupant pack support extends substantially perpendicular to the planar surface of the seat back.

According to another exemplary embodiment, the inwardly-projecting shelf defined by the occupant pack support extends approximately 1.0 to 3.0 inches from the planar surface of the seat back.

According to another exemplary embodiment, the occupant pack support has a width dimension of between 8.0 to 12.0 inches.

According to another exemplary embodiment, the occupant pack support has a height dimension of between 2.0 and 5.0 inches.

BRIEF DESCRIPTION OF THE DRAWINGS

The description of exemplary embodiments proceeds in conjunction with the following drawings, in which.

DESCRIPTION OF EXEMPLARY
EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
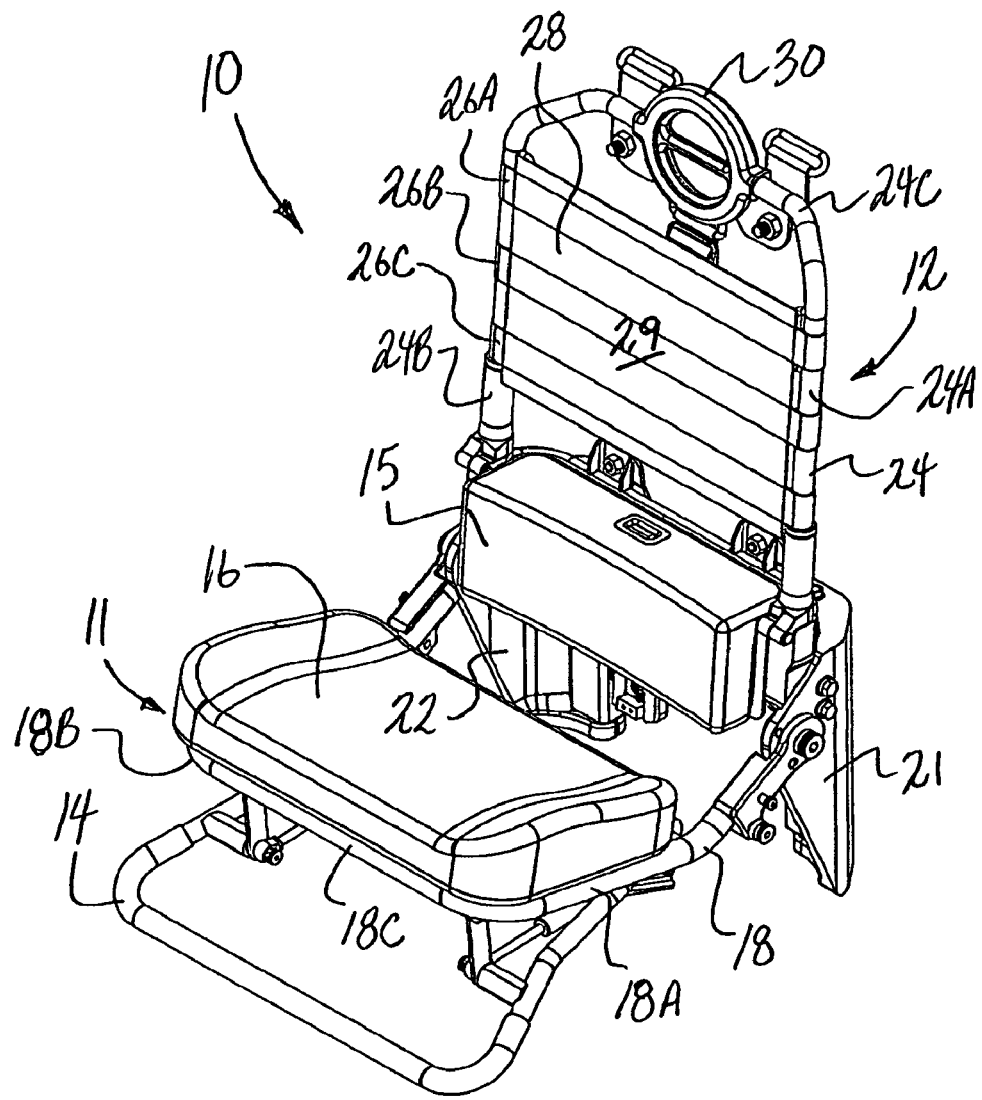
FIG. 1 is a perspective view of an ultra-heavy-duty vehicle seat assembly according to one exemplary embodiment of the present disclosure.

Referring now specifically to the drawings, an ultra-heavy-duty vehicle seat assembly according to one exemplary embodiment of the present invention is illustrated in FIG. 1, and shown generally at reference numeral 10. The exemplary seat assembly 10 has particular application in military, law enforcement, and emergency-response vehicles including land vehicles, aircraft, and water craft. Passengers in such vehicles are commonly required to carry supplies, medical kits, ammunition, weapons, body armor, parachutes, floatation devices, and other equipment in "packs" intended to be worn in the vehicle during transport. In one implementation, the exemplary seat assembly 10 may be used in military land vehicles, such as mine-resistant ambush protected (MRAP) vehicles, and may incorporate various energy attenuating and blast mitigating features designed for occupant safety and protection. In other applications, the exemplary seat assembly 10 may be used in civil land vehicles including recreational off-road vehicles, SUVs, ATVs, and UTVs.

Figure 2:
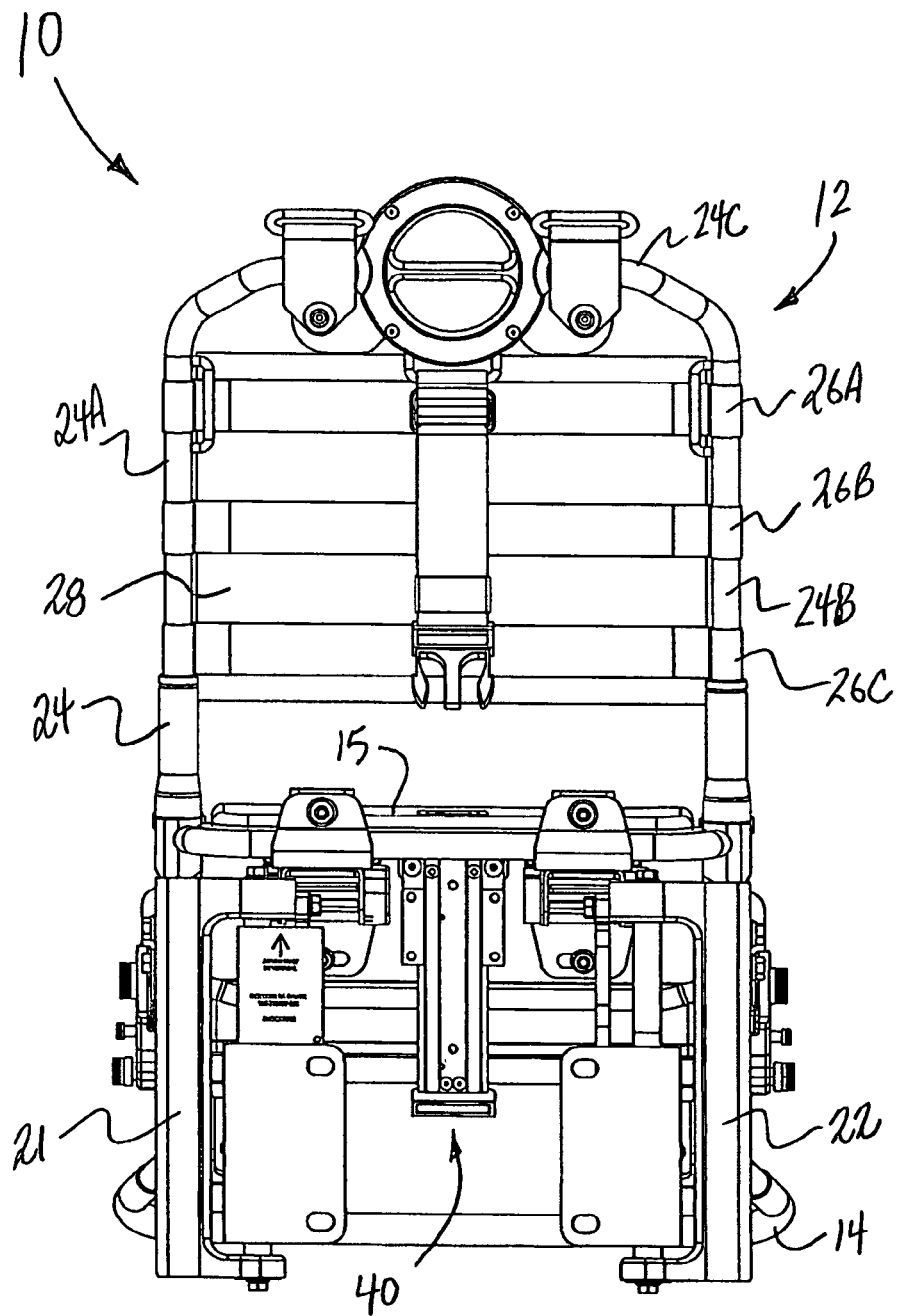
FIG. 2 is a rear view of the vehicle seat assembly.

Referring to FIGS. 1 and 2, the exemplary seat assembly 10 incorporates a seat bottom 11, seat back 12, shock-assisted footrest 14, and adjustable occupant pack support 15. The seat bottom 11 comprises a padded contoured platform 16 carried by a generally U-shaped tubular metal frame 18. The metal frame 18 is pivotally attached at it proximal ends to respective mounting brackets 21, 22 fixed (directly or indirectly) to the vehicle, and has spaced tubular side bars 18A, 18B and an integrally-formed distal end bar 18C. The seat bottom 11 resides in a substantially horizontal position in-use, and may be pivoted upwardly to a stowed position (not shown) when not in use. The seat back 12 comprises a similar U-shaped metal frame 24, and is likewise pivotally attached at its proximal ends to respective mounting brackets 21, 22. The back frame 24 has spaced tubular side bars 24A, 24B and an integrally-formed distal end bar 24C. Adjustable-length nylon straps 26A, 26B, 26C are attached to and extend between the back side bars 24A, 24B, and cooperate with a fabric (e.g., canvas) panel 28 to form a substantially planar back support surface 29. Alternatively, the nylon straps 26A, 26B, 26C may be lengthened to create an occupant pack cavity in the seat back 12 between the side and distal end bars 24A, 24B, 24C.

When not in use, the seat back 12 may pivot downwardly to provide access to the space behind the seat assembly 10. A single twist-operated handle 30 formed with the distal end bar 24C may function to release the seat back 12 from a normally locked upright position, thus allowing the seat back 12 to fold down over the seat bottom 11. The shock-assisted foot rest 14 is pivotally mounted to the seat bottom 11, and resides below the distal end bar 18C of the bottom frame 18. The present seat assembly 10 is configured to mount to a vertical surface or wall of the vehicle proximate the seat back 12, and/or to the floor beneath the seat bottom 11. Additionally, the seat assembly 10 may incorporate conventional multi-point safety straps or harnesses (not shown).

Figure 3:
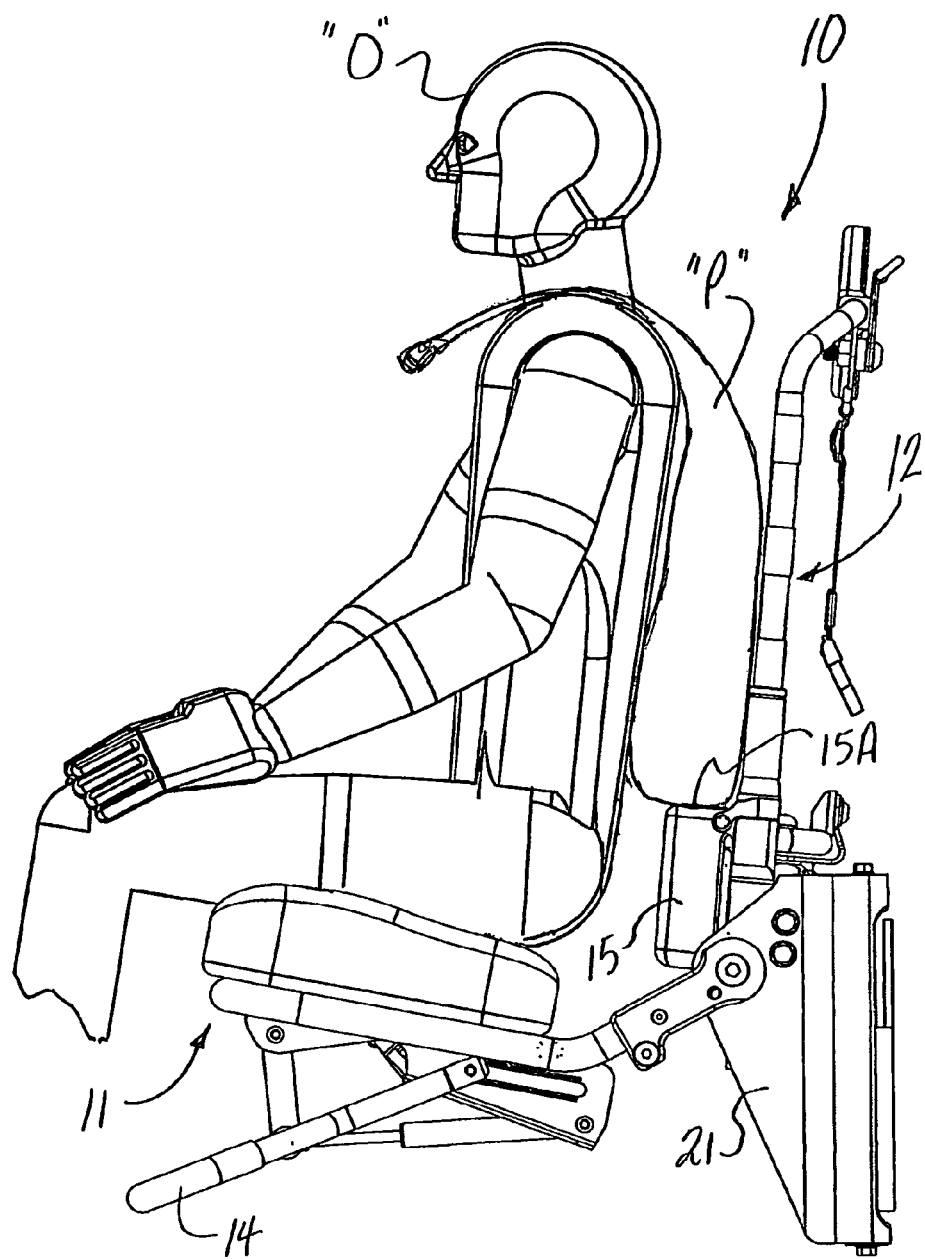
FIG. 3 is a side elevation of the vehicle seat assembly with the occupant pack support in lowered vertical position.
Figure 4:
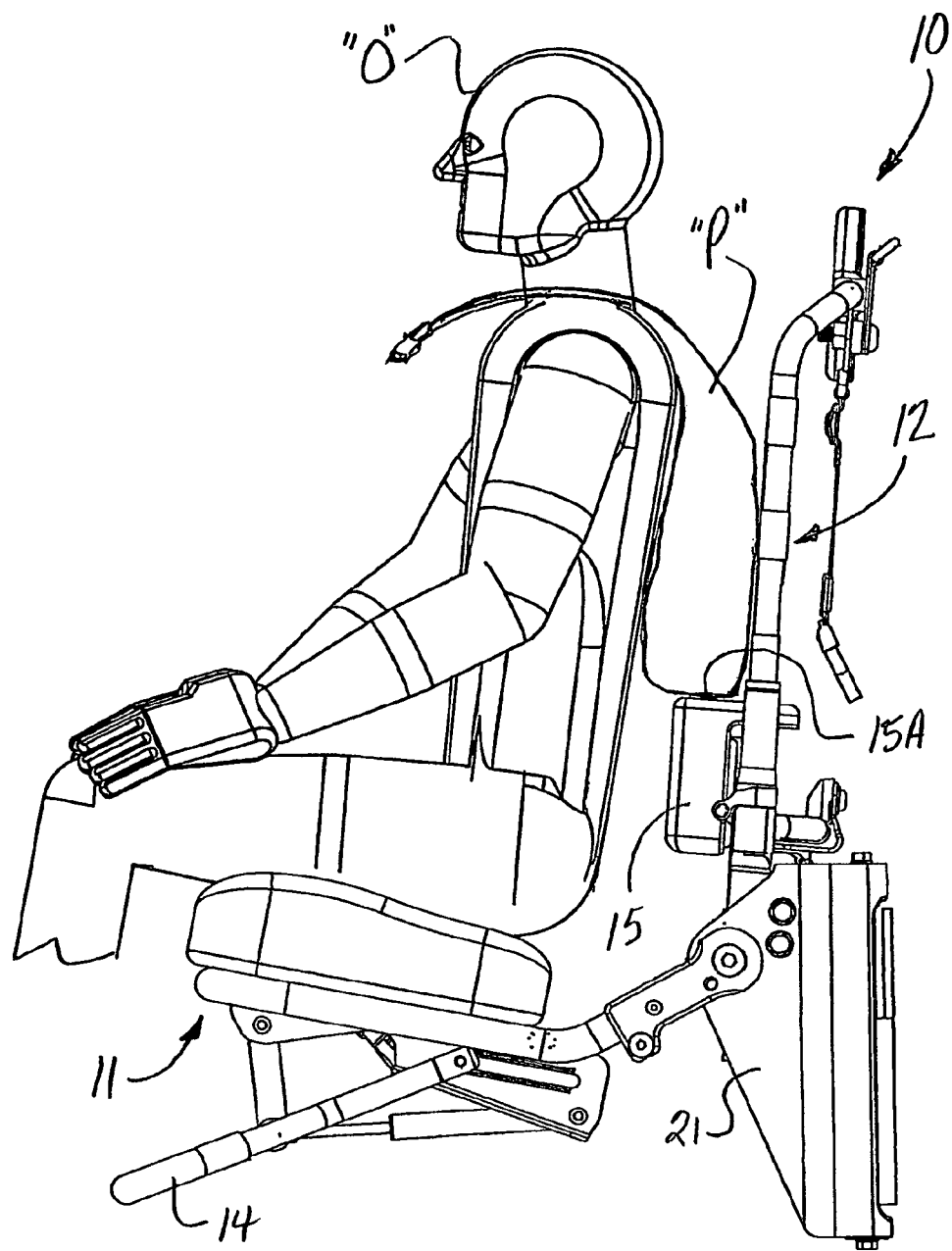
FIG. 4 is a side elevation of the vehicle seat assembly with the occupant pack support in raised vertical position.

As shown in FIGS. 3 and 4, the occupant pack support 15 resides adjacent the planar surface 29 of the seat back 12, and defines a generally flat inwardly-projecting shelf 15A for vertically supporting an equipment pack "P" carried on a back of the occupant "O". The pack shelf 15A extends approximately 1.0 to 3.0 inches inwardly from the planar surface 29 of the seat back 12, and has sufficient structural integrity along its depth dimension to adequately hold the weight of pack "P". The pack support 15 is operatively connected to an adjustment mechanism 40, discussed below, adapted for enabling ready custom height adjustment of the pack shelf 15A to suit each particular occupant "O". FIGS. 3 and 4 show the occupant pack support 15 in lowered and raised positions, respectively—the range of vertical displacement being from about 2.0 to 5.0 inches. In the exemplary embodiment, the occupant pack support 15 has a width dimension of between 8.0 to 12.0 inches, and a height dimension of between 2.0 and 5.0 inches.

Figure 5:
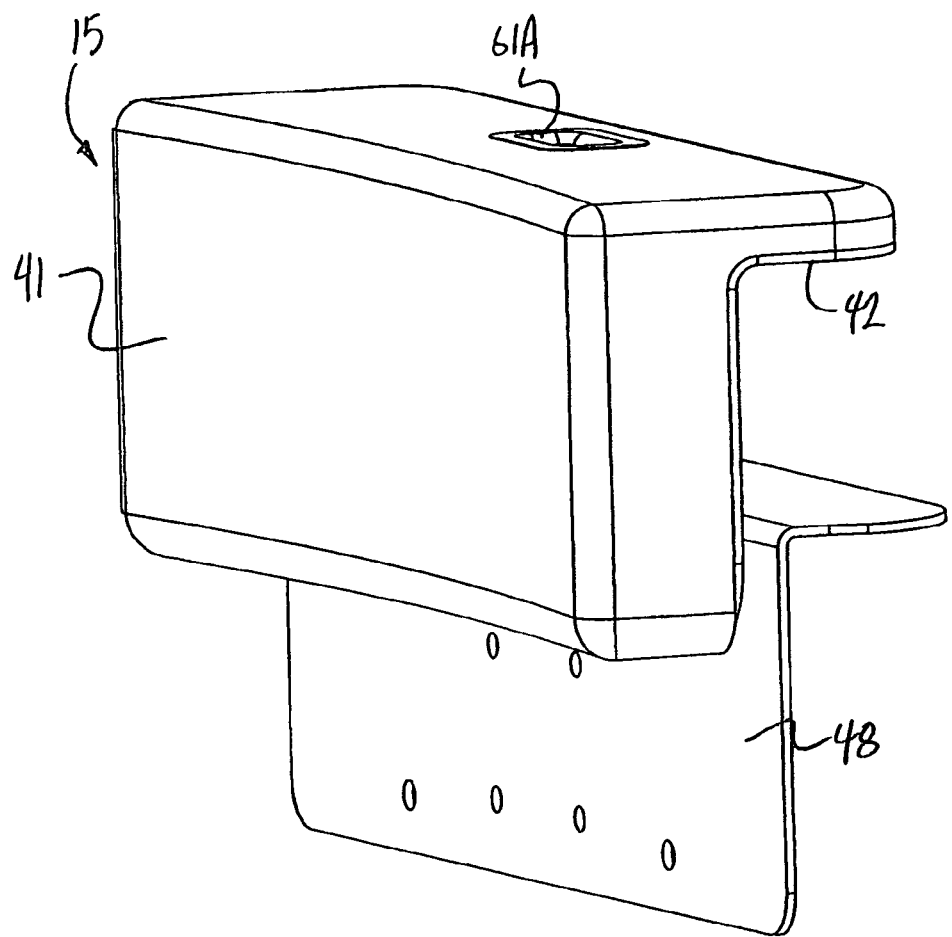
FIG. 5 is a front perspective view of the occupant pack support and angled seat back pan.
Figure 6:
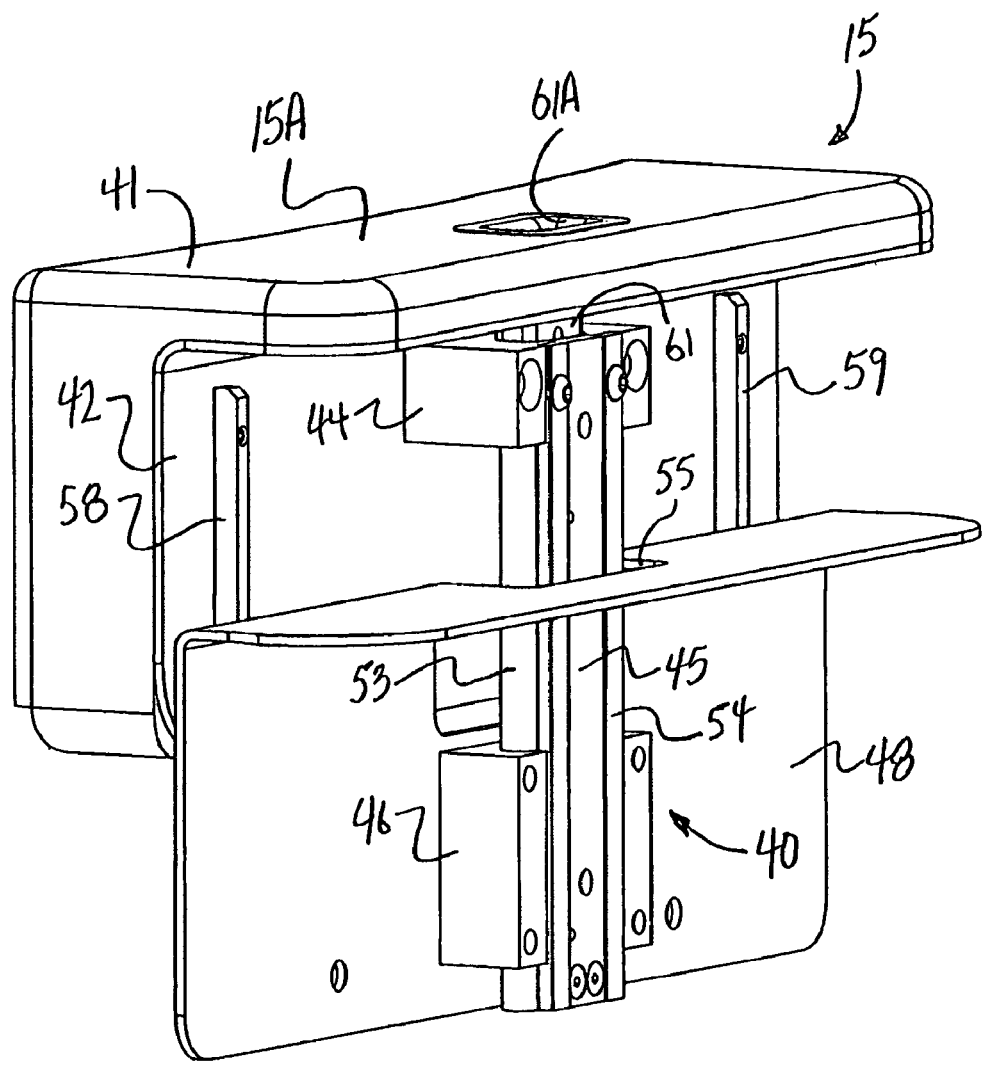
FIG. 6 is a rear perspective view of the occupant pack support, angled back pan, and vertical adjustment mechanism.
Figure 7:
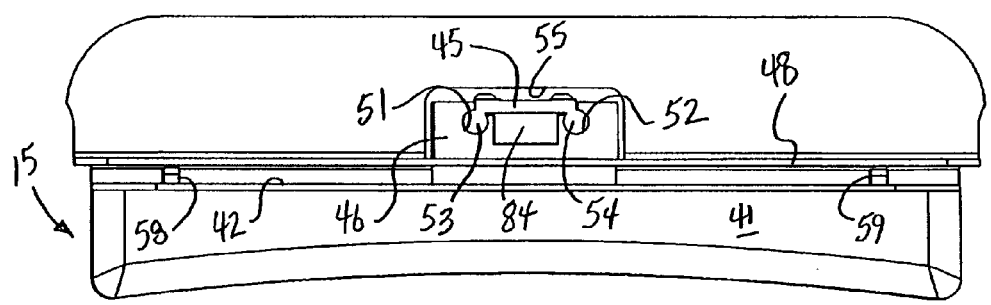
FIG. 7 is a bottom end view of the occupant pack support, angled back pan, and vertical adjustment mechanism.

Referring to FIGS. 5, 6, and 7, the occupant pack support 15 comprises an inverted L-shaped lumbar impact pad 41 attached to a corresponding angled metal frame 42. A pack-support mounting block 44 is fixed (e.g. bolted) to a backside of the angled frame 42, and attaches to one end of an elongated linear slide 45. The opposite end of the linear slide 45 passes through a seat mounting block 46 fixed by bolts to an angled metal back pan 48 of the seat assembly 10. The seat mounting block 46 defines spaced arcuate tracks 51, 52, best shown in FIG. 7, designed to slidably receive respective integrally-formed longitudinal side rails 53, 54 of the linear slide 45. The angled back pan 48 is secured to the seat assembly 10 between assembly mounting brackets 21, 22 (FIG. 1), and defines a center opening 55 design to accommodate passage of the pack-support mounting block 44 upon movement of the occupant pack support 15 to and from its lowermost vertical position. Spacers 58, 59 are attached to the angled frame 42 the pack support 15, and function to maintain consistent spacing between the pack support 15 and back pan 48 upon vertical movement of the linear slide 45. See FIG. 7.

Operation of the Vertical Adjustment Mechanism 40

Figure 8:
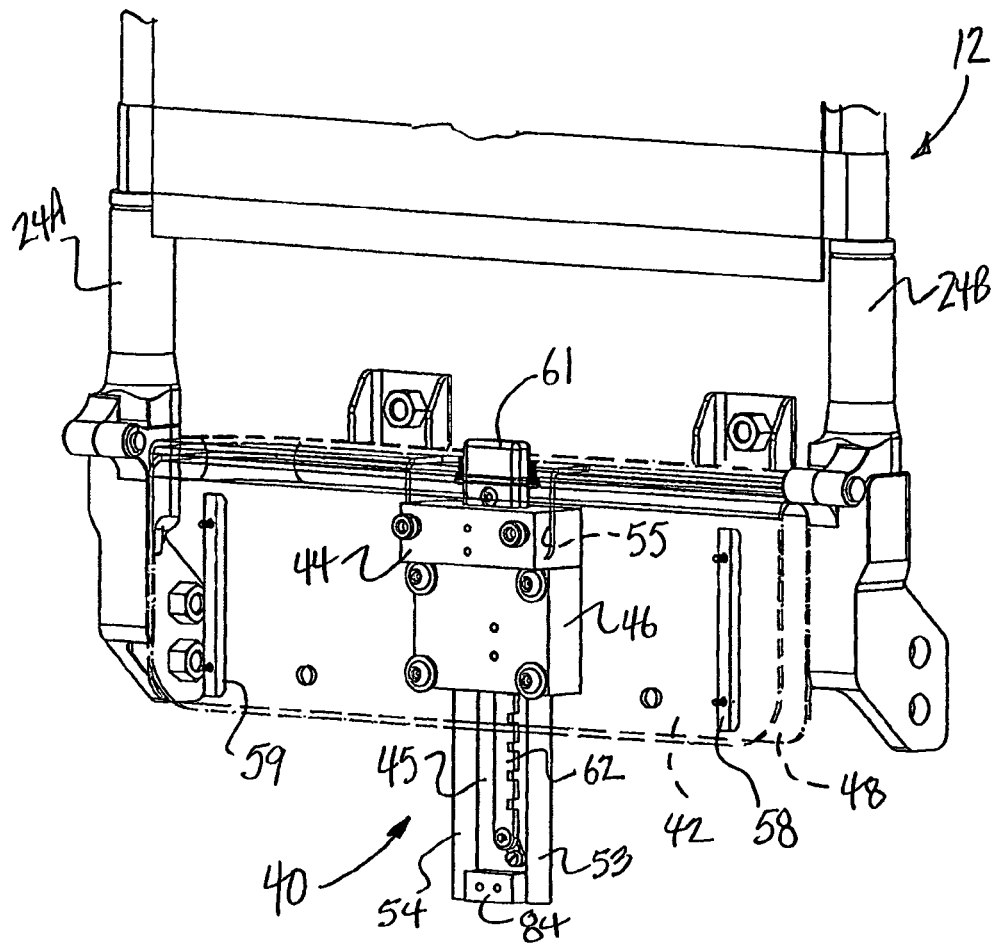
FIG. 8 is a perspective view of the vertical adjustment mechanism with the pack support frame and back pan shown in hidden lines, and showing the pack-support mounting block in a lowermost position.
Figure 9:
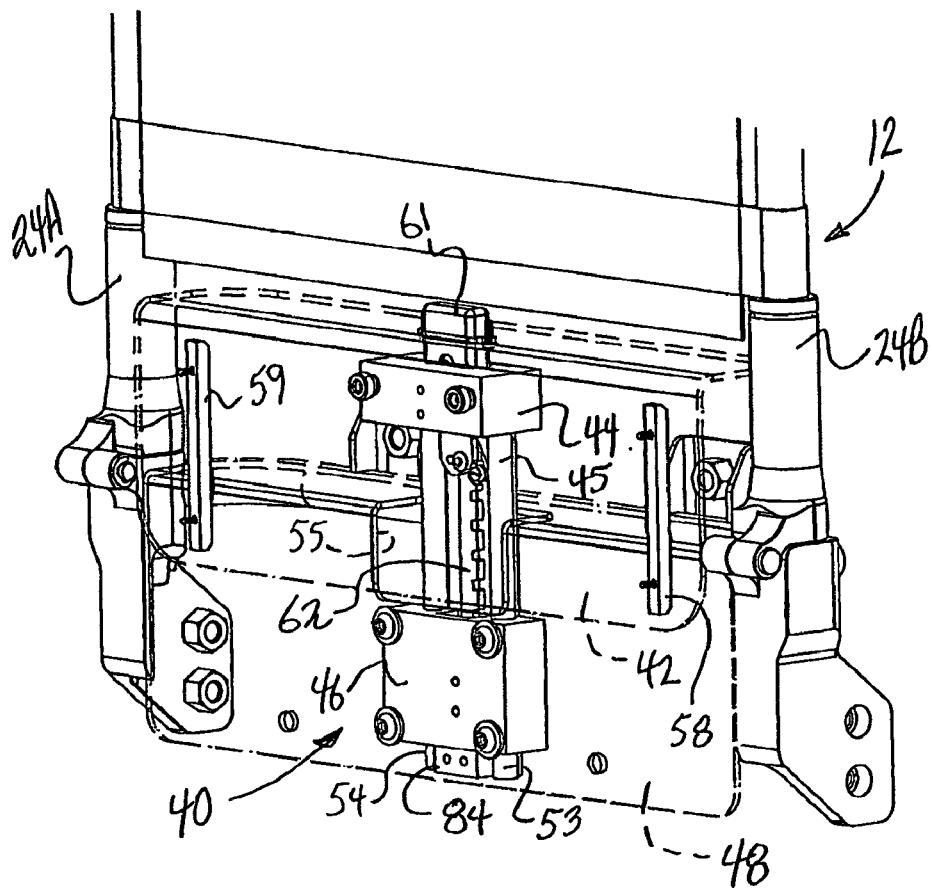
FIG. 9 is a perspective view of the vertical adjustment mechanism with the pack support frame and back pan shown in hidden lines, and showing the pack-support mounting block in an uppermost position.

Referring to FIG. 8, in the lowered position of the occupant pack support 15 (not shown), the pack-support mounting block 44 resides directly adjacent the fixed seat mounting block 46 within the center opening 55 defined by the angled back pan 48. The angled frame 42 of the pack support 15 substantially overlies a front side of the angled back pan 48, and is separated from the back pan 48 by spacers 58, 59 mentioned above. A spring biased push-button 61 projects into reinforced opening 61A formed with the pack support pad 41 (See FIGS. 5 and 6), and is actuated by the occupant to enable vertical sliding movement of the linear slide 45 relative to the fixed seat mounting block 46 as the pack support 15 (with attached angled frame 42 and mounting block 44) is manually lifted to the raised position shown in FIGS. 6 and 9. Once raised, the push-button 61 is released by the occupant and returns the linear slide 45 to a normally locked condition.

Figure 10:
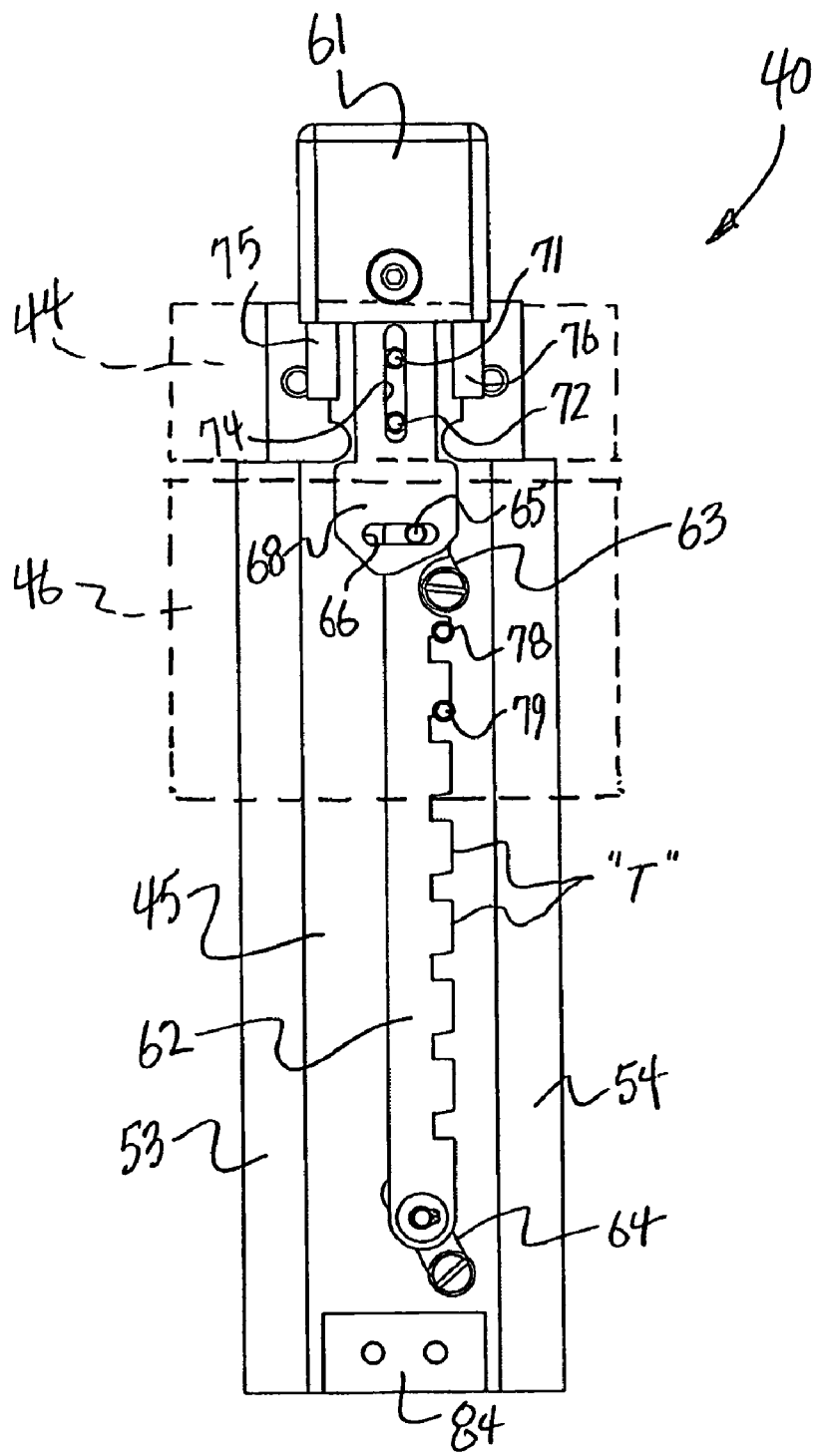
FIGS. 10, 11, and 12 are sequential views demonstrating operation of the vertical adjustment mechanism for lifting the pack support from the lowered position to the raised position.
Figure 11:
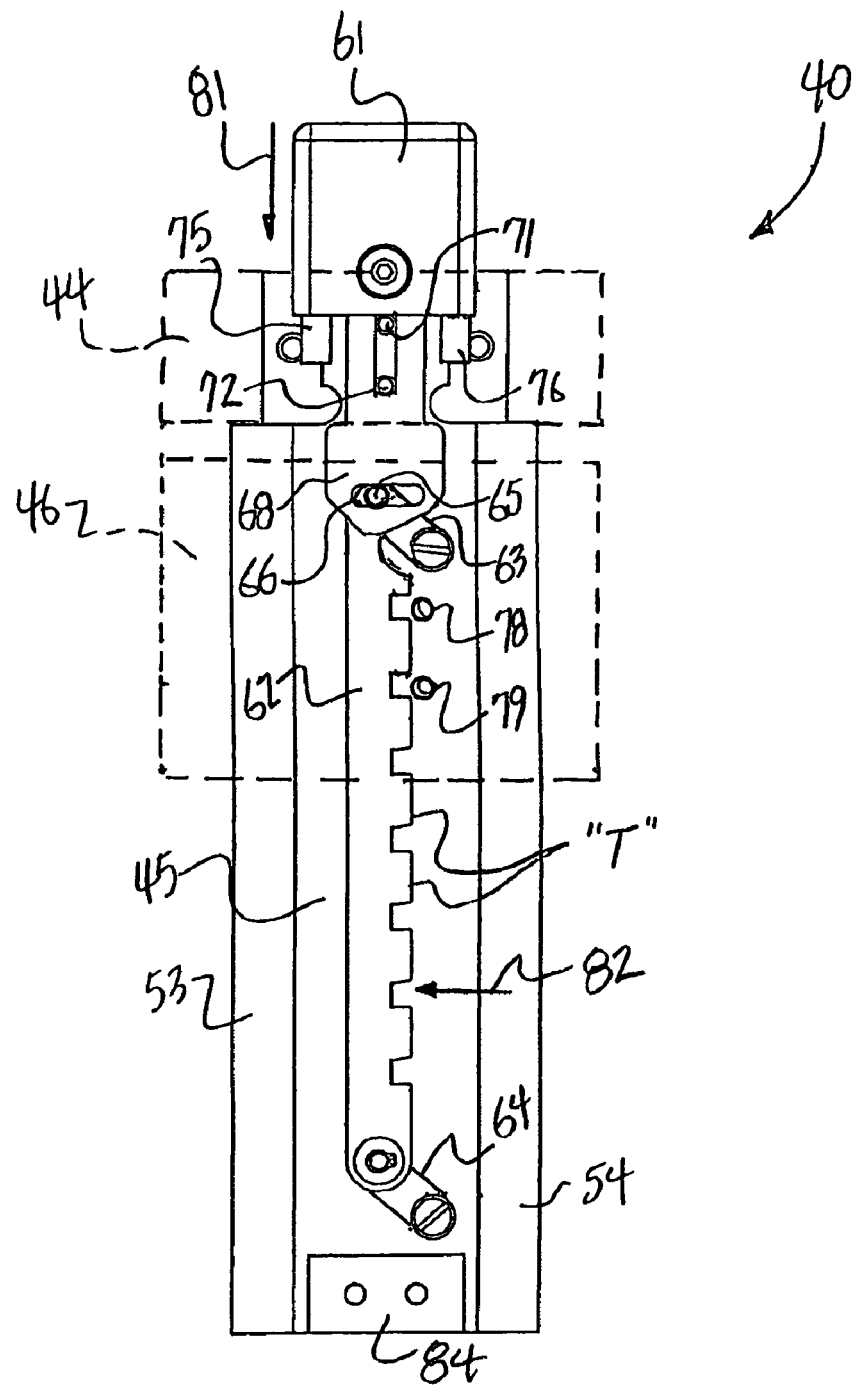
Figure 12:
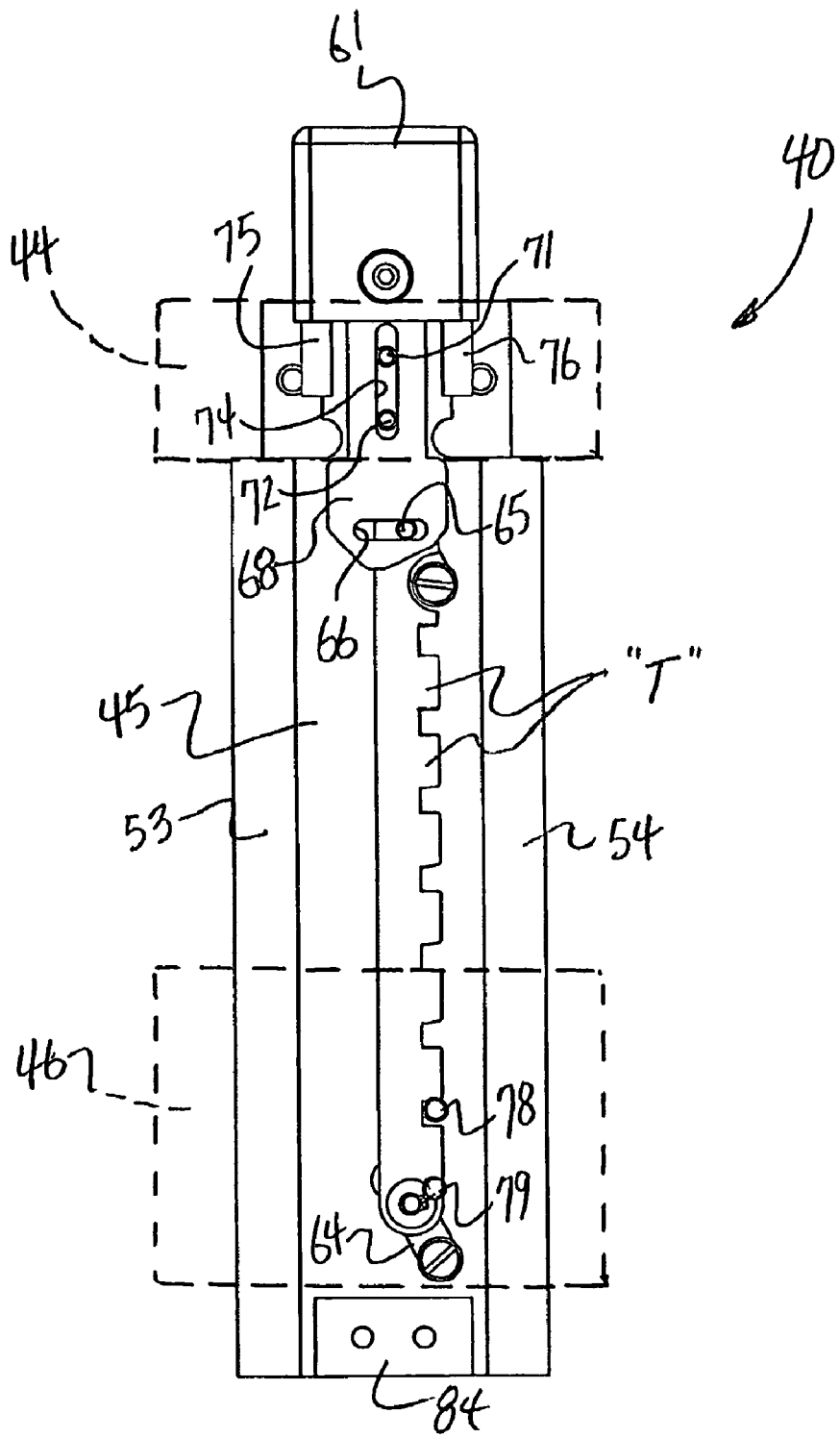

FIGS. 10, 11, and 12 demonstrate sequential operation of the vertical adjustment mechanism 40 discussed above. In addition to the linear slide 45 and push-button 61, the adjustment mechanism 40 incorporates a pivoted linkage assembly including a toothed flat pivot bar 62, opposing pivot feet 63, 64, and drive pin 65. The drive pin 65 interconnects linked ends of pivot foot 63 and the toothed pivot bar 62, and inserts within a horizontal slot 66 defined by drive tab 68 attached to the push-button 61. Fixed alignment pins 71, 72 insert within a vertical slot 74 formed with the drive tab 68, and function to maintain proper vertical alignment of the drive tab 68 relative to the drive pin 65 and toothed pivot bar 62 when the push-button 61 is depressed. The opposite end of toothed pivot bar 62 is pivotally linked to the second pivot foot 64.

In the lowered position shown in FIG. 10, the push-button 61 is biased outwardly by springs 75, 76 to locate the toothed pivot bar 62 in a normally locked position, wherein vertically-spaced locking pins 78, 79 fixed to the seat mounting block 46 reside in respective spaces between adjacent teeth "T" of the pivot bar 62. Referring to FIG. 11, to unlock the toothed pivot bar 62, the occupant depresses the push-button 61 as indicated by arrow 81 causing the drive tab 68 to engage and push the drive pin 65. The drive pin 65 shifts within the horizontal slot 66 of the drive tab 68 as the pivot feet 63, 64 cooperate to rotate the toothed pivot bar 62 away from the locking pins 78, 79 of the fixed seat mounting block 46. See arrow 82. With the toothed pivot bar 62 unlocked, as shown in FIG. 11, the pack-support mounting block 44 (carrying the pack support 15) can be freely lifted to the fully raised position shown in FIG. 12. When the desired vertical position is reached, the occupant releases the spring biased push-button 61 causing the drive tab 68 to pull the drive pin 65 upwardly, thereby moving the toothed pivot bar 62 back into locking engagement with locking pins 78, 79 of the fixed seat mounting block 46. A slide stop 84 is fixed to the lower end of the linear slide 45 to limit vertical displacement of the occupant pack support 15 in the raised position.

Alternatively, the pack support's vertical height may be custom adjusted by the occupant to a lesser raised position—the range of adjustment being defined by the vertical length between the slide stop 84 and fixed seat mounting block 46. In intermediate vertical positions, the toothed pivot bar 62 receives the locking pins 78, 79 of the fixed seat mounting block 46 within respective spaces between adjacent intermediate teeth "T". In other embodiments, the present occupant pack support 15 may be fixed to the seat back to reside generally in a lumbar region of the occupant.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

What is claimed is:

1. A vehicle seat assembly, comprising:
   a seat bottom adapted for use in a substantially horizontal position;
   a seat back adjacent said seat bottom, and comprising a back support surface adapted for use in a substantially upright position, a generally U-shaped tubular back frame comprising opposing spaced-apart side bars and a distal end bar, and a rigid seat back pan extending between the side bars of said tubular back frame;
   an occupant pack support adjacent the back support surface of said seat back, and defining a generally flat inwardly-projecting shelf for vertically supporting an equipment pack carried on a back of an occupant seated in said assembly;
   a pack-support adjustment mechanism operatively secured to said seat back pan, and enabling select vertical displacement of said occupant pack support relative to said seat bottom, and wherein said pack-support adjustment mechanism comprises an elongated linear slide having opposing first and second ends, a slide stop located at the first end, and a pack-support mounting block located at the second end and fixed to said occupant pack support, and wherein said linear slide defines a range of vertical displacement of said occupant pack support; and
   a seat mounting block fixed to said seat back pan, and slidably receiving said linear slide therethrough to adjustably position said occupant pack support relative to said seat bottom.

2. A vehicle seat assembly according to claim 1, and comprising means for adjusting a position of said occupant pack support relative to said seat bottom and said seat back.

3. A vehicle seat assembly according to claim 1, wherein the range of vertical displacement of said occupant pack support is between 2.0 to 5.0 inches.

4. A vehicle seat assembly according to claim 1, wherein said vertical adjustment mechanism further comprises an elongated toothed pivot bar adjacent said linear slide, and adapted for selectively engaging at least one locking pin fixed to said seat mounting block.

5. A vehicle seat assembly according to claim 4, wherein said vertical adjustment mechanism further comprises an occupant-actuated push button operatively linked to said toothed pivot bar, and adapted for being depressed to move said toothed pivot bar into an unlocked position away from said locking pin, whereby said linear slide is freely slidable relative to said seat mounting block to adjust a vertical location of said occupant pack support relative to said seat bottom.

6. A vehicle seat assembly according to claim 5, and comprising at least one spring cooperating with said occupant-actuated push button to urge said toothed pivot bar into a locked position relative to the locking pin of said seat mounting block.

7. A vehicle seat assembly according to claim 1, and comprising first and second assembly mounting brackets pivotably interconnecting respective proximal ends of said seat bottom and said seat back.

8. A vehicle seat assembly according to claim 1, wherein said seat bottom comprises a generally U-shaped tubular seat frame comprising opposing spaced-apart side bars and a distal end bar.

9. A vehicle seat assembly according to claim 8, and comprising an occupant foot rest located beneath the distal end bar of said seat frame.

10. A vehicle seat assembly according to claim 1, wherein the back support surface of said seat back is substantially planar.

11. A vehicle seat assembly according to claim 10, wherein the inwardly-projecting shelf defined by said occupant pack support extends substantially perpendicular to the planar surface of said seat back.

12. A vehicle seat assembly according to claim 11, wherein the inwardly-projecting shelf defined by said occupant pack support extends approximately 1.0 to 3.0 inches from the planar surface of said seat back.

13. A vehicle seat assembly according to claim 1, wherein said occupant pack support has a width dimension of between 8.0 to 12.0 inches.

14. A vehicle seat assembly according to claim 13, wherein said occupant pack support has a height dimension of between 2.0 and 5.0 inches.

* * * * *